United States Patent Office 2,717,259
Patented Sept. 6, 1955

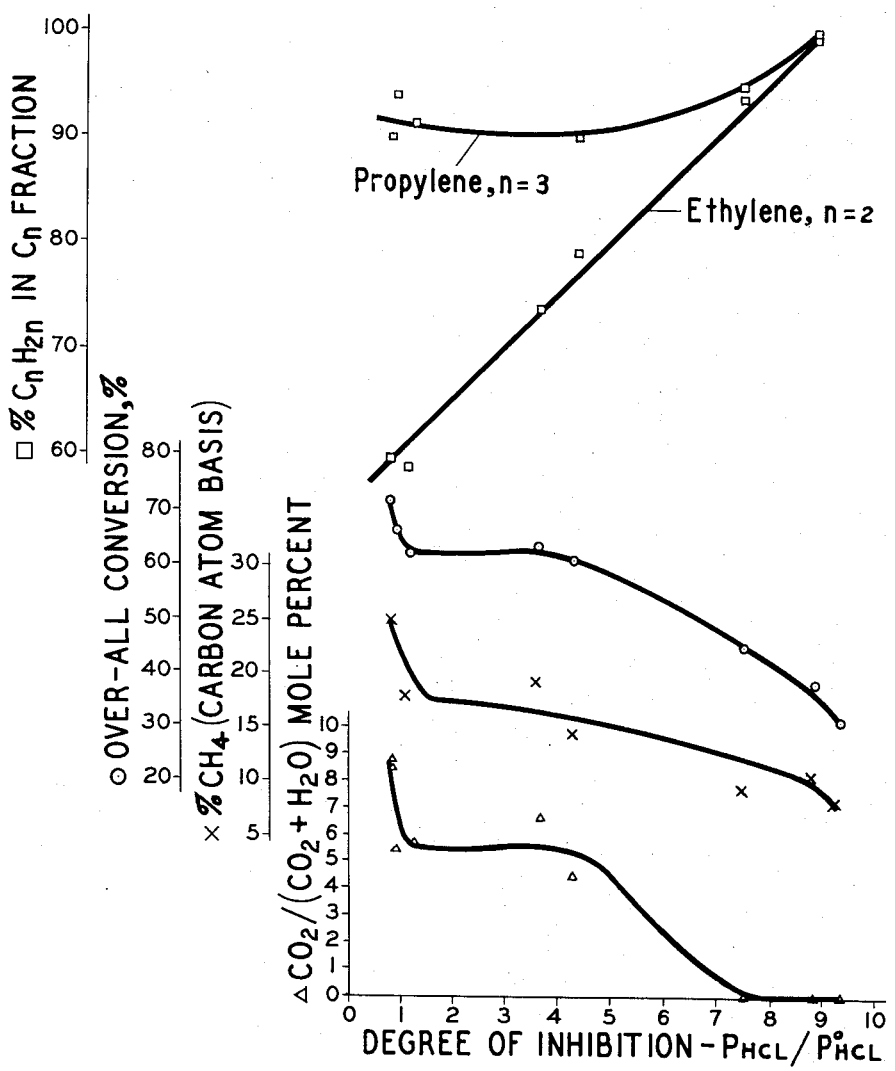
EFFECT OF DEGREE OF INHIBITION ON OLEFIN, METHANE AND $CO_2$ FORMATION AND CONVERSION OF $(CO+H_2)$ TO HYDROCARBONS USING A FLUIDIZED IRON CATALYST AND $C_2H_4Cl_2$ INHIBITOR
$P_{HCL}$ = CALC. PARTIAL PRESSURE OF HCL IN WET EXIT GASES
$P°_{HCL}$ = EQUILIBRIUM PARTIAL PRESSURE OF HCL AT REACTION TEMP.
PRESSURE = 60 P.S.I. G.
TEMPERATURE = 339°–375°C.
INVENTORS
HUBERT G. DAVIS
THOMAS P. WILSON

2,717,259
HYDROCARBON SYNTHESIS EMPLOYING AN IRON CATALYST IN THE PRESENCE OF A HALOGEN CONTAINING REGULATOR

Hubert G. Davis and Thomas P. Wilson, Charleston, W. Va., assignors to Union Carbide and Carbon Corporation, a corporation of New York Application January 4, 1950, Serial No. 136,813

14 Claims. (Cl. 260—449.6)

The production of hydrocarbons by the catalytic reduction of carbon monoxide with hydrogen is now a well established process. Most of the previous investigators have developed the process with a view to obtaining a high yield of liquid products boiling in the gasoline range in order to supplement the production of these fuels from petroleum. Others have studied the reaction to establish conditions under which methane is the principal reduction product, and their discoveries have been utilized in increasing the heating value of gaseous fuels.

According to this invention, the problem of hydrocarbon synthesis has been approached to ascertain conditions under which the principal product of the reaction will be a mixture of normally gaseous hydrocarbons containing from two to four carbon atoms (hereinafter termed the $C_2$–$C_4$ fraction) and in which the olefin content of this fraction will be high. Hydrocarbon fractions of this nature constitute the raw materials from which the bulk of the industrial aliphatic chemicals are derived, and a synthetic source of these materials to augment the present sources which are primarily natural gas concentrates and refinery gases would be highly desirable.

In the preliminary course of this investigation, principally with iron catalysts in a fixed bed, the usual variables governing catalytic reactions, such as temperature, pressure, reactant ratio, and the like, were explored and found to have no important effect on the amount of the $C_2$–$C_4$ fraction formed. For instance, the yield of the $C_2$–$C_4$ fraction on a carbon atom basis remained fairly constant over a temperature range of 220° to 320° C. at about 25 to 40% of the hydrocarbons formed. It was, however, noted that the concentration of the liquid fraction ($C_5$ and higher hydrocarbons) did decrease with increasing temperature, but was accompanied by a corresponding increase in methane formation, the amount of the $C_2$–$C_4$ fraction remaining about the same. The percentage distribution of the hydrocarbons formed on a carbon atom basis, as used in this specification, is the percentage distribution of carbon atoms among the hydrocarbons. For example, in a gas mixture whose components are in the ratio of 2 molecules of methane-$CH_4$ (1 carbon atom per molecule), 1 molecule of ethane-$C_2H_6$ (2 carbon atoms per molecule) and 2 molecules of propane-$C_3H_8$ (3 carbon atoms per molecule), there will be a total of ten carbon atoms in five molecules of the mixture, and the percentage distribution of the hydrocarbons on a carbon atom basis is computed as follows:

$$CH_4 = \frac{2 \times 1}{10} \times 100 = 20\%$$

$$C_2H_6 = \frac{1 \times 2}{10} \times 100 = 20\%$$

$$C_3H_8 = \frac{2 \times 3}{10} \times 100 = 60\%$$

It has now been found that a radical redistribution of the hydrocarbons formed in the catalytic reduction of carbon monoxide with hydrogen can be accomplished by selective inhibition of an iron base catalyst to increase the formation of olefins containing from two to four carbon atoms and to decerase the formation of carbon dioxide. Inhibition of the catalyst during synthesis is effected by including in the reaction system the halogens: chlorine, bromine or iodine or the corresponding hydrogen halides. The halogens or hydrogen halides may be introduced themselves, or compounds capable of yielding them under reaction conditions may be introduced to the reaction system. As compounds capable of yielding halogens or hydrogen halides, the organic compounds of chlorine, bromine and iodine may be cited, since such organic halides decompose under the reaction conditions. When the term "halogen" or "halide" is hereafter used in this specification the group of chlorine, bromine or iodine or the corresponding halides will be intended. Fluorine and the fluorides are excluded because experiments have shown that they are not effective inhibitors. When synthesis gas composed of carbon monoxide and hydrogen is passed over a halide-inhibited iron-base catalyst at reaction temperatures of 200° to 450° C., the $C_2$–$C_4$ fraction usually constitutes about half of the hydrocarbons formed, and the olefin content of this $C_2$–$C_4$ fraction is approximately twice the olefin content of $C_2$–$C_4$ fractions formed from uninhibited catalysts after steady operating conditions have been obtained.

The effect of selective inhibition of iron-base catalysts on the product distribution at reaction temperatures in the range of 220° to 320° C. can be generalized in the table below:

| Hydrocarbons | Percent Distribution of Hydrocarbons on a Carbon Atom Basis | |
|---|---|---|
| | With Untreated Catalysts | With Inhibited Catalysts |
| $CH_4$ | 10–30 | 10–25 |
| $C_2$–$C_4$ olefins | 10–20 | 25–45 |
| $C_2$–$C_4$ paraffins | 10–30 | 10–25 |
| $C_5$ and higher | 30–60 | 20–50 |
| Total $C_2$–$C_4$ fraction | 25–40 | 40–65 |

It will be noted from the above table that the olefin content of the $C_2$–$C_4$ fraction produced with inhibited catalysts is markedly increased. It has also been determined that the olefin content of the liquid fraction produced with inhibited catalysts is likewise quite high.

Inhibition of the catalyst also reduces greatly the amount of carbon dioxide formed in the synthesis reaction. A low concentration of carbon dioxide in the product gas is an advantage because the removal of this material from the other products provides an additional operating expense. Thus, the principal reaction occurring with the inhibited catalysts may be represented as follows:

(1) 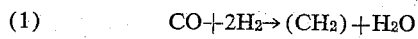
$$CO + 2H_2 \rightarrow (CH_2) + H_2O$$

the corresponding reaction (2), below, which yields carbon dioxide, is decreased.

(2) 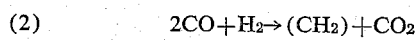
$$2CO + H_2 \rightarrow (CH_2) + CO_2$$

As a rule, inhibited catalysts are less active than the catalysts before inhibition, and, as a result, the conversion of synthesis gas to total hydrocarbons will be less per pass using the inhibited catalysts, other conditions being equal. However, the percent conversion per pass of synthesis gas to hydrocarbons can be increased by raising the reactor temperature up to an appropriate operating level for the catalyst used. The percent conversion as used in this specification is given by the equation:

$$\text{Percent conversion} = \frac{V_1}{V_2} \times 100$$

where $V_1$ = Volumes of $CO + H_2$ reacted.
$V_2$ = Total volumes of fresh feed gas.

For example, where the total volume of feed gas contained 50 mols of carbon monoxide and 50 mols of hydrogen, and exit gas produced from that feed gas contained 30 mols of carbon monoxide and 20 mols of hydrogen, the percent conversion was 50.

Two methods of calculating the conversion as so defined are (1) from the measured inlet and outlet gas flow and the outlet gas analysis and (2) from the outlet gas flow, the outlet gas analysis and the measured amount of product water, by a simple stoichiometric relation well known to the art. Generally the latter method was found more accurate and convenient, and most conversions were calculated by this method.

Inhibition of catalysts has been successfully accomplished in either the fixed or fluid bed type reactors. There are no fundamental differences in the results obtained by the two procedures. Addition of inhibitors can be either intermittent or continuous in order to make up for its loss from the system by reason of equilibrium considerations. However, with fixed beds there is some tendency to produce different degrees of inhibition along the bed, so that in practice it is somewhat easier to operate with a fluidized bed where the continuous mixing of the catalyst gives a more homogeneous distribution of inhibitor.

Several methods of inducing initial inhibition of a fixed bed catalyst are available. According to one method, the catalyst is first activated in a known manner as by reduction with hydrogen or by reaction with carbon monoxide or a mixture of hydrogen and carbon monoxide (when carbon monoxide is used either by itself or in admixture with hydrogen, the process is known in the art as "forming"). After activation of the catalyst, a suitable carrier gas, such as hydrogen, carbon monoxide or mixtures of the two known as synthesis gas, to which may be added an organic halogen compound in an amount which for convenience may be determined by its saturated vapor pressure, is passed over the catalyst at an elevated temperature sufficient to decompose the halogen compound. When the inhibitor used is a gas, such as chlorine, it may be metered conveniently into a side-stream of the feed gas. The temperature of the catalyst bed during inhibition will vary depending on the halogen compound used, temperatures of 75°–100° C. being sufficient when the halide is an easily decomposed iodine compound, and temperatures of 200°–300° C. or higher being required for the more stable bromides and chlorides. The amount of the halide used to treat the catalyst may be varied widely depending on the degree of inhibition desired. Under different conditions of treatment, the amounts could vary from 1 to 300 grams of halogen per kilogram of catalyst. As a specific example, iron or an iron-silica catalyst can be inhibited to obtain the benefits of this invention, such as an increase in the olefin content of the product and a decrease in carbon dioxide formation during synthesis, by treating it for 2.5 hours at 400 space velocity and at 240° to 300° C. with an equimolar mixture of hydrogen and carbon monoxide feed gas which has been saturated at room temperature and 250 p. s. i. g. with ethylene dichloride.

In practice, the inhibitor may be added to the feed gas after the catalyst has been on stream and steady operation obtained. To avoid danger of complete deactivation of the catalyst, it may be desirable to start with a small amount of the inhibitor in the feed gas and gradually increase the concentration while closely following the changes in the composition of the reaction products. The percent carbon dioxide in the effluent gases can be measured with an automatic recorder, and a significant drop in the carbon dioxide content of the product gases would indicate that inhibition was being effected.

After a catalyst has been brought to an appropriate state of inhibition, the effects, although persisting for prolonged periods, gradually decrease. At the same time it is observed that halogen is lost from the catalyst. Hence, to maintain a constant degree of inhibition it is necessary to compensate for this loss, usually by a continuous addition of inhibitor with the feed gas. The persistence of inhibition after the removal of inhibitor from the feed stream is no doubt caused by temporary retention of halide by the catalyst. Such retention of halide is illustrated in the specific example above where after four days operation following the introduction of inhibitor, chloride analysis of the catalyst showed: at the top and entrance to the bed, 6.0%, in the middle, 3.3%, and at the exit, 2.3% (percent Cl by weight).

Another method for the initial introduction of inhibitor to a fixed bed catalyst is by passing a carrier gas saturated with the inhibitor at room temperature over a formed catalyst at a temperature slightly above that of the carrier gas until a sufficient amount of inhibitor has been adsorbed on the catalyst. Then the catalyst, containing the adsorbed inhibitor is heated, generally above 200° C. to decompose the organic halogen compound.

As previously stated, the effects of inhibition disappear slowly, because of the progressive loss of halogen by the inhibited catalyst during the synthesis operation. For the most part the halogen lost appears as hydrogen halide in the liquid water product from the reactor. Thus, after the initial addition of 1 to 300 grams of halogen per kilogram of catalyst to the catalyst, it is necessary to add inhibitor in small regulated amounts with the feed gas during operation in order that production of olefins may be kept high and carbon dioxide formation kept low. As a specific example, an unpromoted iron catalyst in the fluidized state required from 5 to 15 grams of chlorine per kilogram of catalyst to effect initial inhibition of the catalyst, the chlorine being introduced as ethylene dichloride with the feed gas. Thereafter the catalyst was maintained in the inhibited state by adding ethylene dichloride to the feed gas at a rate equivalent to 0.5 gram of chlorine per kilogram of catalyst per hour (0.7 gram of $C_2H_4Cl_2$ per kilogram of catalyst per hour).

It is believed that the loss of chlorine (or other halogen) from an inhibited catalyst is related to an equilibrium which exists between iron halides and hydrogen. In the case of the iron chlorides, this equilibrium may be represented as:

$$FeCl_2 + H_2 \rightleftarrows Fe + 2HCl$$

Thus, unless chlorine in some useful form were added with the feed gas, the chlorine content of the catalyst would be depleted, as the hydrogen chloride is swept from the reaction zone with the product gases. In operation, the amount of chlorine which need be added to maintain the catalyst in an inhibited state at various temperatures may be estimated from the approximate equation—

$$\log_{10} K = \frac{-7620}{T(°K)} + 6.75$$

$K$ = Equilibrium const. = $\frac{(p_{HCl})^2}{p_{H2}}$ (atm. abs.)

$T(°K)$ = Absolute Temp.
$p_{HCl}$ = partial pressure of HCl, atm. abs.
$p_{H2}$ = partial pressure of $H_2$, atm. abs.

For other halogens, the equilibrium and equilibrium constants are given by the relations:

$$FeBr_2 + H_2 \rightleftarrows Fe + 2HBr$$

$\log_{10} K = \frac{-8390}{T(°K)} + 6.66$     $K = \frac{(pHBr)^2}{p_{H2}}$ (atm. abs.)

$$FeI_2 + H_2 \rightleftarrows Fe + 2HI$$

$\log_{10} K = \frac{-7930}{T(°K)} + 6.66$     $K = \frac{(p_{HI})^2}{p_{H2}}$ (atm. abs.)

For example, using these relations, in the temperature range of 250° to 450° C. for operation at 18 atmospheres absolute (250 p. s. i. g.), exit hydrogen partial pressure of 6 atmospheres and an exit flow of 1500 liters of gas per hour, converted to standard conditions, the ranges for the amount of combined or free halogen in the inhibitor to be added to the feed gas to maintain inhibition are approximately as follows, the lowest values corresponding to the lowest temperature and vice versa.

Halogen: Amount (grams per hour)
- Chlorine _____ 0.04–4
- Bromine _____ 0.015–2.5
- Iodine _____ 0.07–8

Thus, it is seen that the concentration of inhibitor in the feed gas is important, and that the amount to be added to maintain inhibition will increase with the temperature and will vary with the other conditions which affect the equilibrium.

The curves in the drawing show the effects of varying the rate of addition of inhibitor during limited periods of time. The rate of addition is plotted as the abscissa in the form of a ratio: the pressure of hydrogen chloride calculated on the assumption that all the ethylene dichloride inhibitor added had decomposed to gaseous hydrogen chloride, divided by the pressure of HCl calculated to be in equilibrium with $FeCl_2$ and $H_2$ according to the equation above. The expression $p_{HCl}$ is the partial pressure of hydrogen chloride in the wet exit gas from the reactor calculated by assuming that all of the inhibitor (ethylene dichloride) added decomposed to form hydrochloric acid and that none of this was lost in the reactor. The expression $p°_{HCl}$ is the equilibrium partial pressure of hydrogen chloride computed from the equation given above. The ratio of $p_{HCl}$ to $p°_{HCl}$ then gives the theoretical excess or deficiency of the amount of inhibitor. The data shown in the curves were obtained in an experiment with a fluidized iron catalyst prepared from magnetite. Synthesis gas ($2.2H_2$:$1CO$) was used at 60 p. s. i. g., and a 1:1 ratio of recycle to fresh synthesis gas was employed. It is to be expected that the effects with various modes of operation and of catalyst preparation will vary somewhat in degree from the specific results shown in the graph.

The curves illustrate that the ethylene content of the $C_2$ fraction increases with the degree of inhibition, while the propylene content of the $C_3$ fraction is very high even for slightly inhibited catalysts. The methane formed decreases with the degree of inhibition, an important effect. By increasing the amount of inhibitor, the formation of carbon dioxide can be completely suppressed but the conversion is reduced to low levels. It is probably significant that the slopes of the conversion, methane and carbon dioxide curves are very steep in the region where $p_{HCl}/p°_{HCl}$ is approximately one, indicating the sharp change in the results obtained with uninhibited catalysts and with fully inhibited catalysts. Operation at ratios of $p_{HCl}/p°_{HCl}$ much greater than one for prolonged periods may result in an excessive chlorination on the catalyst. Should this occur, the catalyst may be regenerated, either continuously or intermittently, by a number of methods such as by a high temperature treatment with hydrogen, or by a temporary decrease in the amount of inhibitor in the feed stream.

A representative number of organic halogen compounds have been tested as inhibitors and found to be operative, and the invention is directed broadly to the use of any organic halogen compound which is capable of being vaporized at the reaction temperatures. The halogen compounds which have been evaluated include the following: n-butyl chloride, t-butyl chloride, ethylene dichloride, 1,4-dichlorobutane, 1,2,3-trichloropropane, dichloroethyl ether, glycerol-dichlorohydrin, m-dichlorobenzene, p-dichlorobenzene, carbon tetrachloride, ethylene dibromide, trimethylene chlorobromide, ethyl iodide and n-butyl iodide.

Since the experimental evidence indicates that organic inhibitors function by releasing halogens or hydrogen halides in the reactor, useful inhibition can also be obtained by treating the catalysts with the halogens themselves, i. e. chlorine, bromine and iodine, the halogen halides, or inorganic compounds capable of yielding hydrogen halides or halogens, such as carbonyl chloride. Thus, it is evident that there are many ways by which the iron catalysts can be subjected to the action of halogens or hydrogen halides during the synthesis operation.

The catalysts which are useful in our process of hydrocarbon synthesis include any of the typical iron-base catalysts which are known in the art. Iron catalysts containing promoters may be inhibited and the following promoters and supports, taken as typical of the additives which may be used with iron catalysts, have been present in significant amounts in inhibited iron-base catalysts: $SiO_2$, $TiO_2$, Cu, $Al_2O_3$, Cd, Ni, and $K_2CO_3$. In preparing an iron-base catalyst, either iron or an oxide of iron may be used, although after reduction or "forming" of the catalyst, as by reduction with hydrogen, carbon monoxide or a mixture of the two, iron oxide catalysts may exist in a reduced state or in a carbided state. Fluid catalysts must, of course, be prepared with a suitable particle size distribution, as is known in the art, so that they exhibit the typical qualities of a fluid catalyst bed.

Control of the usual process variables of the hydrocarbon synthesis can be effected with the inhibited catalysts, and the phenomenon of inhibition is exhibited over a wide range of these process variables. The significant process controls are temperature, pressure, space velocity, ratio of hydrogen to carbon monoxide, and in cyclic operations, the ratio of product gas which is recycled through the converter to the fresh synthesis gas introduced. In general, any temperature, pressure, space, velocity, hydrogen to carbon ratio, and recycle ratio otherwise suitable for hydrocarbon synthesis may be used, and the following ranges may be listed as illustrative:

- Temperature _____ 250°–420° C.
- Pressure _____ 60 to 600 p. s. i.
- Space velocity _____ 100 to 5,000 (vols./vol. cat./hr.)
- $H_2$:CO ratio _____ 1:2 to 5:1
- Recycle ratio _____ None to 10:1

The reaction temperature is probably the most significant process variable. Although the percent conversion increases with temperature for both inhibited and untreated catalysts, the conversion per pass with an inhibited catalyst will be less for the same reaction temperature than with untreated catalyst, other conditions being equal. There is evidence that the temperature sensitivity (i. e. change in activity with temperature) as well as the activity of the catalyst is reduced by inhibition, so that inhibition of the catalyst simplifies temperature control of the highly exothermic synthesis. Operation at temperatures of 320° to 400° C. is feasible with inhibited catalysts. In fact, the higher temperatures are not disadvantageous since highly olefinic products are made without increase in the production of methane. With uninhibited catalysts, methane formation is pronounced at high temperatures. Operation over a wide temperature range has also shown that wax formation and carbon deposition on the catalyst are significantly reduced as a result of inhibition. The reduction in wax formation and carbon deposition obtained by the present process is of considerable importance as the life of the catalyst before regeneration is required is thereby increased.

Of the examples to follow, the first six are concerned with fixed bed catalysts, and Examples 7 to 9 relate to fluid bed catalysts.

FIXED BED CATALYSTS

*Apparatus and procedure.*—The reactor consisted of a ¼ inch I. D. steel tube which contained the catalyst and extended through an insulated steel shell filled with Dowtherm. The steel shell was wrapped with resistance wire for electrical heating. The catalyst tube was sealed into the jacket at both ends with compression fittings, which made its installation and removal simple. The charge of catalyst was 20 cc., as measured in a graduate before charging and extended over about 25 inches of the tube. The catalyst was held in place with copper gauze packing at both ends.

In operation, the catalyst chosen was loaded into a piece of steel tubing of appropriate length. This was installed in the empty jacket by means of the compression fittings. Both ends of the tube were soldered into the copper tubing connecting to the rest of the unit. The system was tested for leaks with carbon dioxide or nitrogen at 250–300 p. s. i. g. The gas used for reduction or forming (hydrogen, carbon monoxide or their mixtures) was then introduced to the system and the reactor temperature raised to the level appropriate for that gas (usually 300° to 350° C.). Forming in general was done at atmospheric pressure and space velocities of 1000–3000 (20–60 L/hr.). After forming, the temperature of the reactor usually was lowered to a level suitable for synthesis. This was done with the forming gas still flowing. On reaching the proper reactor temperature, synthesis gas was admitted at the selected pressure, in most cases 250 p. s. i. g.

*Example 1.—Ethylene dichloride inhibitor*

The catalyst, $Fe_2O_3:CuO:SiO_2$ (100:2.5:100 parts by weight), was prepared by precipitation from a solution of copper and iron nitrates by sodium carbonate to an end point pH of 7.8. Silica (Filtercel) was added and the mixture boiled. It was then filtered and the pricipitate washed. The bulk density of the final catalyst preparation was about 0.9 gram per cubic centimeter. The catalyst was charged to the reactor and treated with carbon monoxide at 310°–335° C. for two hours with a space velocity of 3000.

Synthesis gas in the ratio of one mol of hydrogen to one mol of carbon monoxide was passed over the catalyst at a pressure of 250 p. s. i. g. and a space velocity of 300 and analysis of the products under steady conditions was made. After some time, the feed gas at reaction pressure was passed through ethylene dichloride at 25° C. to saturate the gas and introduce inhibitor to the catalyst for a total of 3½ hours at a space velocity of 300 to 400 and a catalyst temperature of 280° C. The amount of inhibitor introduced was about 140 cc. of vapor measured at standard conditions. (The amount of ethylene dichloride added was equivalent to about 25 grams of chlorine per kg. of catalyst.) A comparison of the reaction conditions and results with inhibited and uninhibited catalysts is given below:

|  | Before Inhibition | After Inhibition | | |
|---|---|---|---|---|
|  |  |  |  | Av. |
| Age of catalyst, hours | 31 | 194 | 197 |  |
| Temperature, °C | 270 | 290 | 297 |  |
| Conversion, percent | 80 | 68 | 56 |  |
| Carbon atom distribution in hydrocarbons formed, percent to: |  |  |  |  |
| $CH_4$ | 18 | 14 | 15 | 15 |
| $C_2H_4$ | 3⎫ | 9⎫ | 12⎫ |  |
| $C_3H_6$ } $C_2$–$C_4$ olefins | 13 }25 | 20 | 22 } | 44 |
| $C_4H_8$ | 9⎭ | 12⎭ | 13⎭ |  |
| $C_2H_6$ | 11⎫ | 21⎫ | 13⎫ |  |
| $C_3H_8$ } $C_2$–$C_4$ paraffins | 3 }16 |  |  | 21 |
| $C_4H_{10}$ | 2⎭ | 2⎭ | 6⎭ |  |
| $C_5+$ | 41 | 22 | 19 | 20 |
| $CO_2/CO_2+H_2O$ (molar ratio) | 0.75 | 0.32 | 0.24 | 0.28 |

It will be noted that inhibition resulted in a decided increase in olefin formation, and a radical change in the molar ratio of carbon dioxide to water formed in the reaction, the carbon dioxide decreasing and the water increasing. The inhibited catalyst was also less active as shown by a decreased conversion at a higher reaction temperature.

*Example 2.—Ethylene dichloride inhibitor*

The catalyst was a taconite iron ore and the synthesis was conducted in a manner similar to that of Example 1. The catalyst was reduced with hydrogen at 450° C. for 20 hours. Inhibition was effected by passing over the catalyst at 325° C. for 3 minutes 0.1 cf. of hydrogen saturated at room temperature and one atmosphere with ethylene dichloride. The amount of inhibitor added was equivalent to 0.9 gram of chlorine and equaled about 30 grams of chlorine per kilogram of catalyst (the catalyst used having a volume of 20 cc. and a bulk density of 1.6 grams per cubic centimeter). The reaction conditions and results, before and after inhibition, are tabulated below:

| Conditions | Before Inhibition | After Inhibition |
|---|---|---|
| Ratio, $H_2:CO$ | 1:1 | 1:1 |
| Pressure, p. s. i. | 250 | 250 |
| Age of catalyst, days | 2 | 9 |
| Temperature, °C | 288 | 336 |
| Space velocity | 420 | 420 |
| *Results* |  |  |
| Over-all conversion, percent | 40 | 37 |
| $CO_2/CO_2+H_2O$ (molar ratio) | 0.31 | 0.06 |
| Carbon atom distribution in hydrocarbons formed, percent to: |  |  |
| $CH_4$ | 22.5 | 20.7 |
| $C_2H_4$ ⎫ | 2.1 ⎫ | 12.5 ⎫ |
| $C_3H_6$ } $C_2$–$C_4$ olefins | 12 }23.1 | 18.5 }42.5 |
| $C_4H_8$ ⎭ | 9 ⎭ | 11.5 ⎭ |
| $C_2H_6$ ⎫ | 7.9 ⎫ | 3.7 ⎫ |
| $C_3H_8$ } $C_2$–$C_4$ paraffins | 3.8 }16.7 | 1.5 } 6.9 |
| $C_4H_{10}$ ⎭ | 5 ⎭ | 1.7 ⎭ |
| $C_5+$ | 38 | 30 |

This example illustrates that under conditions whereby the yield of the $C_2$–$C_4$ fraction is fairly high with an uninhibited catalyst, the principal effects of inhibition on the product distribution are a marked increase in the olefins formed, a sharp reduction in carbon dioxide formed, and a decrease in methane formation despite the higher temperature of the inhibited catalyst.

*Example 3.—Various amounts of ethylene dibromide inhibitor*

The catalyst was similar to that described in Example 1. The method of introducing inhibitor was the same except that the temperature of the catalyst during inhibition was 240°–260° C. The synthesis gas ratio was $1H_2:1CO$. Other conditions and results are given below:

| Amount of $C_2H_4Br_2$ | | Synthesis Temp., °C | Conversion, Percent | $\dfrac{CO_2}{CO_2+H_2O}$ | Carbon Atom Distribution of Hydrocarbons Formed, Percent to— | | | |
|---|---|---|---|---|---|---|---|---|
| cc. of Vapor at Standard Conditions | g./kg. Cat. | | | | $CH_4$ | $C_2$–$C_4$ Olefins | $C_2$–$C_4$ Paraffins | $C_5+$ |
| 80 | 32 | 293 | 47 | 0.39 | 11 | 38 | 23 | 28 |
| 250 | 100 | 295 | 39 | 0.10 | 15 | 38 | 16 | 31 |

Example 4.—Ethyl iodide inhibitor

The catalyst was $Fe_2O_3$—$SiO_2$ in equal parts by weight and had a bulk density of around 0.9. The carrier gas containing the volatilized ethyl iodide inhibitor in the amount of 1500 cc. of vapor at standard conditions (about 950 g. iodine per kg. catalyst) was passed over the reduced catalyst at 75–86° C., a large amount of inhibitor being required because of the low temperature of treatment. The synthesis gas ratio was $1H_2:1CO$. Other conditions and results are given below:

| | |
|---|---|
| Reaction temperature °C | 299 |
| Conversion, per cent | 35 |
| $CO_2/CO_2+H_2O$ (molar ratio) | 0.20 |
| Carbon atom distribution of hydrocarbons formed, per cent to $CH_4$ | 20 |
| $C_2$–$C_4$ olefins | 41 |
| $C_2$–$C_4$ paraffins | 10 |
| $C_5+$ | 29 |

Example 5.—Various organic chloride inhibitors

Several organic chlorides were passed over reduced $Fe_2O_3$—$SiO_2$ (equal parts by weight) catalysts by means of the carrier gas procedure described in Example 1. The synthesis gas ratio was $1H_2:1CO$. Other conditions and results are given below:

| | 1,4-Di-chloro-butane | 1,3-Di-chloro-benzene | 1,2,3-Tri-chloro-propane |
|---|---|---|---|
| Amount of inhibitor: | | | |
| cc. of vapor at standard conditions | 200 | 1,500 | 300 |
| g./kg. catalyst | 36 | 270 | 54 |
| Inhibition temperature, °C | 220–260 | 220–260 | 225–240 |
| Reaction temperature, °C | 302 | 269 | 253 |
| Conversion, percent | 54 | 44 | 42 |
| $CO_2/CO_2+H_2O$ (molar ratio) | 0.36 | 0.15 | 0.12 |
| Carbon atom distribution of hydrocarbons formed, percent to: | | | |
| $CH_4$ | 20 | 14 | 15 |
| $C_2$–$C_4$ olefins | 35 | 36 | 30 |
| $C_2$–$C_4$ paraffins | 22 | 13 | 20 |
| $C_5+$ | 23 | 39 | 35 |

The specific effect of the inhibitor on the olefin concentration is to be noted in each instance.

Example 6.—Hydrogen chloride inhibitor

Inhibition of an iron-silica-copper catalyst, $Fe_2O_3(100)$, $SiO_2(100)$, $Cu(2.5)$, in parts by weight was accomplished by adding hydrogen chloride to the synthesis gas ($1H_2:1CO$) and passing the gas over the catalyst at a temperature of about 70° C.; the amount of hydrogen chloride added in this manner being about 1.5 grams. The results are tabulated below:

| | |
|---|---|
| Age of catalyst, hours | 168 |
| Reaction temp. °C | 271 |
| Conversion, per cent | 49 |
| $CO_2/CO_2+H_2O$ (molar ratio) | 0.30 |
| Carbon atom distribution in hydrocarbons formed, per cent to $CH_4$ | 15 |
| $C_2$–$C_4$ olefins | 30 |
| $C_2$–$C_4$ paraffins | 13 |
| $C_5+$ | 33 |

The typical effects of increased olefin formation are to be noted.

FLUID BED CATALYST

*Apparatus and procedure.*—The reactor was constructed of a three inch I. D. steel pipe having a jacket filled with a circulating liquid. The jacket was heated electrically. The catalyst was charged to the reactor and kept in a fluid condition by the passage of the synthesis gas through the bed. The exit gases passed through a ten inch I. D. header containing ceramic or sintered metal filters to recover suspended catalyst, the recovered catalyst being periodically blown back to the catalyst bed. The exit gas passed through a water-cooled condenser at the reaction pressure to remove liquid. The inlet flow to the reactor was measured by calibrated orifices and the exit flow by dry gas meters. Means for recycling part of the product gas, when desired, were provided.

Example 7.—Ethylene dichloride continuous inhibition

Pigment grade iron oxide ($Fe_2O_3$) was made into a thick paste with water. The paste was dried in an oven and then sintered at 1200° C. for two hours. The catalyst was crushed and ground to a fineness so that all particles passed through a standard 270 mesh screen and the catalyst fines having a particle size less than 20 microns were removed by gas elutriation. The catalyst was reduced with hydrogen and charged to the reactor. The catalyst volume was 4920 ml.

As previously stated, catalysts when given a single treatment with inhibitor gradually cease to be inhibited due to halide loss. For instance, the above catalyst, when initially treated with about 17 grams of chlorine from ethylene dichloride yielded a $C_2$–$C_4$ fraction at 48% conversion and one to one recycle ratio which contained on a carbon atom basis 67% olefins. After continued operation for a period of time, the hydrocarbons produced with the same catalyst contained 36% olefins in the $C_2$–$C_4$ fraction and the conversion increased to 63%, indicating that the effects of inhibition had been largely lost. Loss of chloride from the catalyst bed was confirmed by the fact that the water product of the reaction contained hydrochloric acid.

Upon adding ethylene dichloride to the feed gas at the rate of 7 grams per hour (1 gram of chlorine per kilogram of catalyst) for 14 hours the conversion dropped to 43% and the olefin content of the $C_2$–$C_4$ fraction rose to 72%. Thereafter, ethylene dichloride was added continuously at an average amount equivalent to 0.3 gram Cl/kg. catalyst per hour for 25 additional hours, the rate of addition being sufficient to prevent any increase in activity of the catalyst, under the particular operating conditions, as measured by the percent conversion.

The conditions and results before and after the foregoing continuous inhibition period are tabulated below:

| | Before Continuous Inhibition | After Continuous Inhibition |
|---|---|---|
| Pressure, p. s. i. g | 250 | 250 |
| Linear velocity, ft./sec | 0.4–0.5 | 0.4–0.5 |
| Make-up synthesis gas, $H_2:CO$ | 2.2:1 | 2.2:1 |
| Recycle ratio | 1:1 | 1:1 |
| Age of catalyst, hours | 579 | 618 |
| Temperature, °C | 312 | 318 |
| Over-all conversion, percent | 63 | 46 |
| Carbon atom distribution in hydrocarbons formed, percent to: | | |
| $CH_4$ | 26 | 14 |
| $C_2H_4$ $C_3H_6$ $C_4H_8$ $C_2$–$C_4$ olefins | 1, 13, 7 = 21 | 9, 20, 13 = 42 |
| $C_2H_6$ $C_3H_8$ $C_4H_{10}$ $C_2$–$C_4$ paraffins | 19, 10, 7 = 36 | 7, 4, 6 = 17 |
| $C_5+$ | 17 | 27 |
| Olefins in $C_2$–$C_4$ fraction, percent | 36 | 72 |
| Propylene in $C_3$–$C_4$ fraction, percent | 23 | 34 |
| $CO_2/CO_2+H_2O$ (molar ratio) | .28 | 0.034 |

The effect of the continuous addition of inhibitor is shown by the significant increase in the olefins formed, by the sharp decrease in carbon dioxide formation, and by the fact that these results were maintained over an extended period of operation.

Example 8.—Ethylene dichloride continuous inhibition

The run started in Example 7 was continued at a recycle ratio of product gas to feed gas of three to one and at various temperatures. During the 69 hour period of the run for which representative samples of the analytical data are given below, ethylene dichloride was added continuously at an average rate of 0.8 gram Cl/kg. catalyst per hour. The conditions and results are tabulated below:

| | | |
|---|---|---|
| Pressure, p. s. i. g. | 250 | 250 |
| Linear velocity, ft./sec. | 0.4–0.5 | 0.4–0.5 |
| Make-up synthesis gas, $H_2$:CO | 2.2:1 | 2.2:1 |
| Recycle ratio | 3:1 | 3:1 |
| Age of catalyst, hours | 708 | 751 |
| Temperature, °C. | 319 | 330 |
| Over-all conversion, percent | 71 | 80.5 |
| Carbon atom distribution in hydrocarbons formed, Percent to: | | |
| $CH_4$ | 17 | 18.0 |
| $C_2H_4$ ⎫ | 3.6 ⎫ | 2.4 ⎫ |
| $C_3H_6$ ⎬ $C_2$–$C_4$ olefins | 17.5 ⎬ 31.1 | 16.9 ⎬ 29.5 |
| $C_4H_8$ ⎭ | 10.0 ⎭ | 10.2 ⎭ |
| $C_2H_6$ ⎫ | 12.5 ⎫ | 12.2 ⎫ |
| $C_3H_8$ ⎬ $C_2$–$C_4$ paraffins | 4.5 ⎬ 20.2 | 5.0 ⎬ 20.5 |
| $C_4H_{10}$ ⎭ | 3.2 ⎭ | 3.3 ⎭ |
| $C_5+$ | 32 | 32 |
| Olefins in $C_2$–$C_4$ fraction, Percent | 60 | 59 |
| Propylene in $C_2$–$C_4$ fraction, Percent | 34 | 34 |
| $CO_2$/$CO_2$+$H_2O$ (molar ratio) | 0.047 | 0.046 |

Operation at high recycle ratios and increased temperature resulted in greater over-all conversions. The effect of the inhibitor on maintaining the olefin content of the $C_2$–$C_4$ fraction at a high level is also evident, despite the fact that at the higher recycle ratios conditions for hydrogenating olefins to paraffins are much more favorable because of the longer average residence time of olefin molecules in the reactor.

*Example 9.—Chlorine gas inhibition*

An iron oxide catalyst was operated with the continuous addition of ethylene dichloride for a prolonged period. Then the introduction of the inhibitor into the feed gas was stopped and synthesis continued for nine hours. During this period, chlorine was removed from the catalyst bed as hydrogen chloride and the carbon dioxide formation and percent conversion increased. Then chlorine gas was added in small regulated amounts for 10 hours to the synthesis gas to re-inhibit the catalyst. The conditions and results, during inhibition with ethylene dichloride, nine hours after stopping the flow of inhibitor, and after re-inhibition with chlorine gas, are tabulated below:

CONDITIONS

Temperature, ° C. _____ 338–340
Pressure, p. s. i. g. _____ 60
Recycle ratio _____ 1:1
Space velocity _____ 400
Feed gas _____ (2.2$H_2$+1CO)
Catalyst charge _____ 12 kg.

RESULTS

| | During Inhibition with $C_2H_4Cl_2$ | Inhibition Stopped | After Inhibition with Chlorine Gas |
|---|---|---|---|
| Carbon atom distribution, percent to: | | | |
| $CH_4$ | 17 | 30 | 17 |
| $C_2$–$C_4$ (total) | 64 | 58 | 65 |
| $C_5+$ | 19 | 12 | 18 |
| Percent olefins in $C_2$–$C_4$ fraction | 79 | 60 | 77 |
| $CO_2$/$H_2O$+$CO_2$ (molar ratio) | 0.05 | .16 | 0.04 |

Thus, it is shown that re-inhibition with chlorine gas is equivalent to the original inhibition with ethylene dichloride. The increase in methane formation when the inhibitor was discontinued at the high temperature involved, as well as the control of the methane formation by re-inhibition, are noteworthy.

Modifications of the invention other than as specifically disclosed in the examples will be apparent to those skilled in the art, and are included within the scope of the invention as defined in the appended claims.

What is claimed is:

1. In a process for producing liquid and gaseous hydrocarbons wherein an iron-containing hydrocarbon synthesis catalyst is contacted with a gaseous mixture of $H_2$ and CO at synthesis conditions of temperature and pressure, the improvement comprising contacting said iron-containing catalyst during the synthesis reaction with a mixture comprising $H_2$ and CO and one member selected from the group consisting of (a) chlorine, (b) bromine, (c) iodine, (d) hydrogen chloride, (e) hydrogen bromide, (f) hydrogen iodide, (g) organic chlorides, (h) organic bromides, and (i) organic iodides.

2. In a process for producing liquid and gaseous hydrocarbons wherein a fluidized promoted iron-containing hydrocarbon synthesis catalyst is contacted with a gaseous mixture of $H_2$ and CO at synthesis conditions of temperature and pressure, the improvement comprising contacting said iron-containing catalyst during the synthesis reaction with a mixture comprising $H_2$ and CO and one member selected from the group consisting of (a) chlorine, (b) bromine, (c) iodine, (d) hydrogen chloride, (e) hydrogen bromide, (f) hydrogen iodide, (g) organic chlorides, (h) organic bromide, and (i) organic iodides.

3. In the synthesis of hydrocarbons by the reaction of carbon monoxide and hydrogen in the presence of an iron-base catalyst, the improvement which resides in subjecting the catalyst to intimate contact with regulated amounts of a chlorine-containing material capable of releasing hydrochloric acid in contact with the catalyst, the amount of such chlorine-containing material being regulated with the reaction conditions so as to maintain hydrogen chloride in the reaction system in an amount at least approximately equal to that determined by the equilibrium: $FeCl_2+H_2 \rightleftarrows Fe+2HCl$.

4. In the process for producing liquid and gaseous hydrocarbons wherein an iron-containing hydrocarbon synthesis catalyst is contacted with a gaseous mixture of $H_2$ and CO at synthesis conditions of temperature and pressure, the improvement comprising contacting said iron-containing catalyst during the synthesis reaction with a mixture comprising $H_2$, CO and hydrogen chloride.

5. In the process for producing liquid and gaseous hydrocarbons wherein an iron-containing hydrocarbon synthesis catalyst is contacted with a gaseous mixture of $H_2$ and CO at synthesis conditions of temperature and pressure, the improvement comprising contacting said iron-containing catalyst during the synthesis reaction with a mixture comprising $H_2$, CO and an organic chloride.

6. In the process for producing liquid and gaseous hydrocarbons wherein an iron-containing hydrocarbon synthesis catalyst is contacted with a gaseous mixture of $H_2$ and CO at synthesis conditions of temperature and pressure, the improvement comprising contacting said iron-containing catalyst during the synthesis reaction with a mixture comprising $H_2$, CO and ethylene dichloride.

7. In the process for producing liquid and gaseous hydrocarbons wherein an iron-containing hydrocarbon synthesis catalyst is contacted with a gaseous mixture of $H_2$ and CO at synthesis conditions of temperature and pressure, the improvement comprising contacting said iron-containing catalyst during the synthesis reaction with a mixture comprising $H_2$, CO and chlorine.

8. In the synthesis of hydrocarbons by the reaction of carbon monoxide and hydrogen in the presence of an iron-base catalyst, the improvement which resides in subjecting the catalyst to intimate contact with regulated amounts of a bromine-containing material capable of releasing hydrobromic acid in contact with the catalyst, the amount of such bromine-containing material being regulated with the reaction conditions so as to maintain hydrogen bromide in the reaction system in an amount at least approximately equal to that determined by the equilibrium: $FeBr_2+H_2 \rightleftarrows Fe+2HBr$.

9. In the process for producing liquid and gaseous hydrocarbons wherein an iron-containing hydrocarbon synthesis catalyst is contacted with a gaseous mixture of $H_2$ and CO at synthesis conditions of temperature and pressure, the improvement comprising contacting said iron-containing catalyst during the synthesis reaction with a mixture comprising $H_2$, CO and hydrogen bromide.

10. In the process for producing liquid and gaseous hydrocarbons wherein an iron-containing hydrocarbon synthesis catalyst is contacted with a gaseous mixture of $H_2$ and CO at synthesis conditions of temperature and pressure, the improvement comprising contacting said iron-containing catalyst during the synthesis reaction with a mixture comprising $H_2$, CO and an organic bromide.

11. Process of making hydrocarbons which comprises passing a mixture containing carbon monoxide and hydrogen under superatmospheric pressure over an iron-base catalyst at a temperature of about 250° C. to about 450° C., and subjecting the catalyst during reaction to intimate contact with regulated amounts of a member selected from the group consisting of (a) chlorine, (b) bromine, (c) iodine, (d) hydrogen chloride, (e) hydrogen bromide, (f) hydrogen iodide, (g) organic chloride, (h) organic bromides, and (i) organic iodides, and thereby increasing the formation of olefins containing from two to four carbon atoms.

12. Process as claimed in claim 11 in which the catalyst is maintained in a fluid state.

13. Process as claimed in claim 11 in which the member selected is ethylene dichloride.

14. Process as claimed in claim 11 in which the temperature is about 320° C. to about 400° C.

References Cited in the file of this patent

UNITED STATES PATENTS

| | | |
|---|---|---|
| 2,194,186 | Pier et al. | Mar. 19, 1940 |
| 2,245,157 | Pier et al. | June 10, 1941 |
| 2,254,806 | Michael | Sept. 2, 1941 |
| 2,479,439 | Voorhies, Jr. | Aug. 16, 1949 |
| 2,542,464 | Black et al. | Feb. 20, 1951 |